April 21, 1959

F. L. ASELTYNE 2,882,736

WINDSHIELD WIPER MECHANISM SENSITIVE TO
DIRECTION OF ROTATION

Filed April 15, 1957

INVENTOR.
FRANCIS L. ASELTYNE
BY
Falvey, Souther & Stoltenberg
ATTORNEYS

April 21, 1959
F. L. ASELTYNE
2,882,736
WINDSHIELD WIPER MECHANISM SENSITIVE TO
DIRECTION OF ROTATION
Filed April 15, 1957
2 Sheets-Sheet 2
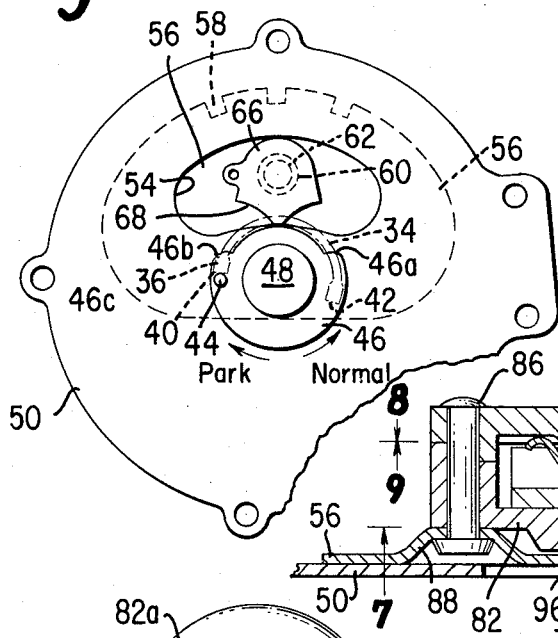
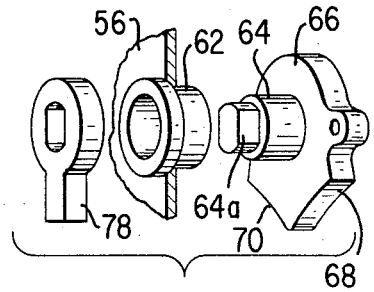
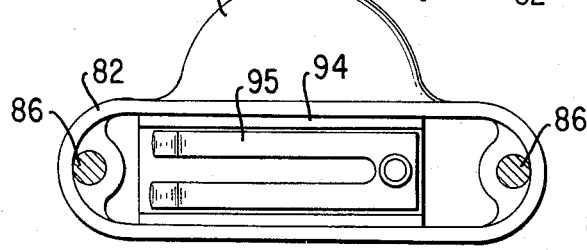
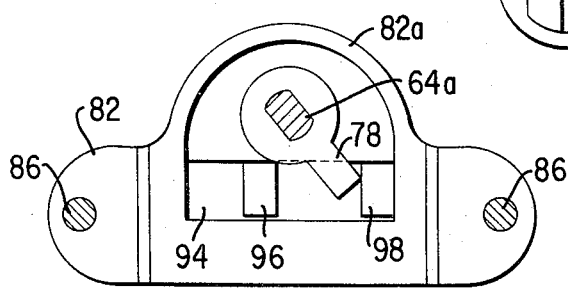
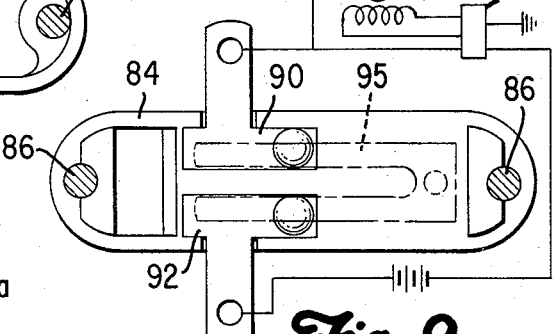
INVENTOR.
FRANCIS L. ASELTYNE
BY
Falvey, Souther & Stoltenberg
ATTORNEYS United States Patent Office 2,882,736
Patented Apr. 21, 1959

2,882,736

WINDSHIELD WIPER MECHANISM SENSITIVE TO DIRECTION OF ROTATION

Francis L. Aseltyne, Waterville, Ohio

Application April 15, 1957, Serial No. 652,928

5 Claims. (Cl. 74—70)

This invention relates to devices which are senstitive to the direction of rotation of a driving member for actuating an element, more particularly to a direction-sensitive actuating means for a switch which opens the power circuit to an electric motor at a predetermined point upon reversal of direction of rotation of the driving motor to park a windshield wiper blade at a point beyond its normal sweep to place the wiper blade outside the field of vision of the operator of the automotive vehicle on which the means are mounted.

Windshield wipers utilized on modern automotive vehicles are designed to park in depressed positions, so that the wiper blades are positioned outside of the field of vision of the operator of the vehicle. One method of attaining this result provides direction-sensitive devices which are actuated by a reversal of rotation of the electric motor used for driving the wipers which requires a switch mechanism which is also sensitive to the direction of rotation of the driving motor and also sensitive to the position of driving portions of the mechanism, so that the power circuit to the motor is broken at the right time when the wiper blades are in depressed position for parking. The present invention contemplates the provision of a direction-sensitive device which is particularly suitable for actuating the switch which cuts off the power to the driving motor under the conditions described above, although the direction-sensitive device may also be used under other conditions, with other devices to attain other desirable ends.

It is, therefore, a principal object of this invention to provide a direction-sensitive device which changes its position to actuate other mechanisms when the direction of rotation of an actuating element occurs.

It is a further object of this invention to provide a direction-sensitive device which actuates a switch mechanism by a change of position upon a reversal of the direction of rotation of a driving electric motor to open the power circuit to the motor when the elements of the device are in a predetermined position.

It is a further object of this invention to provide a direction-sensitive switch control for the electric motor of a windshield wiper, which opens the power circuit to the motor upon a reversal of the direction of rotation thereof, with the windshield wiper blades in a depressed parked position.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 3 is an elevation of the inside face of the cover plate assembly;

Fig. 4 is an exploded isometric view of a portion of the mechanism;

Fig. 6 is a sectional plan view of a portion of the mechanism taken along the line 6—6 of Fig. 2;

Fig. 7 is a sectional elevation taken along the line 7—7 of Fig. 6;

Fig. 8 is an elevation taken along line 8—8 of Fig. 6;

Fig. 9 is an elevation taken along line 9—9 of Fig. 6;

Figure 1:
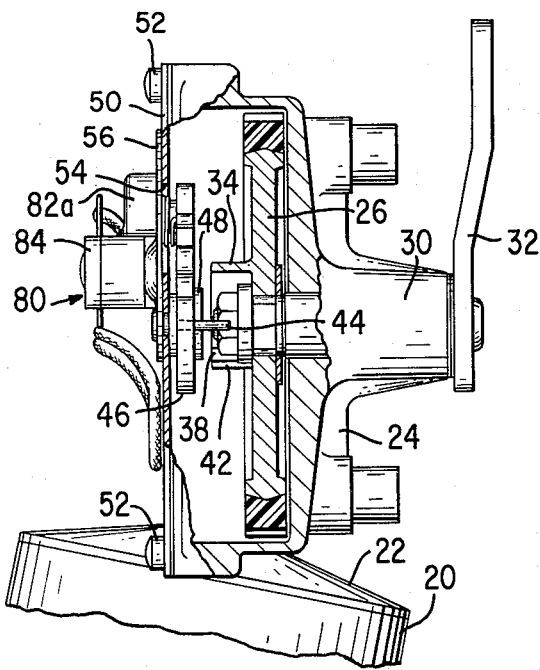
Fig. 1 is a sectional elevation disclosing the application of the invention to a switch actuator for a windshield wiper motor.
Figure 2:
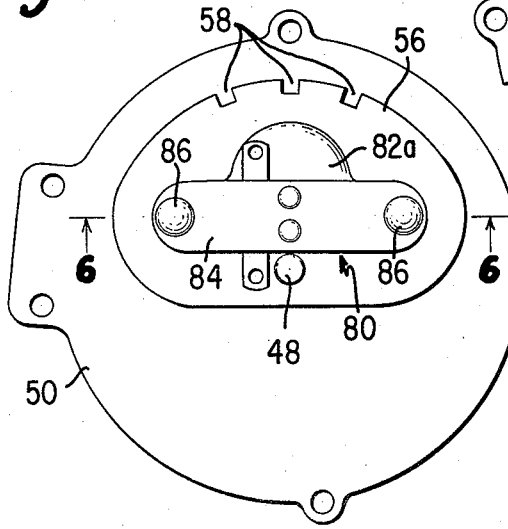
Fig. 2 is an elevation of the outside face of the cover plate assembly.

Referring to the drawings, particularly to Fig. 1, an electric windshield wiper motor 20 is shown, which is of the reversible type, and may be provided with devices (not shown) which provide depressed parking of windshield wipers when the motor is reversed by the operator of the automotive vehicle. Usually these devices comprise a means for changing the length of the connecting links, such as is shown in Scott-Iverson Patent No. 2,308,212, although it is to be understood that the present invention is applicable to other devices where a direction-sensitive mechanism fulfills a requirement, which may be brought about by changing the direction of the driving means. The driving means in the present embodiment about to be described, is an electric motor, which, upon reversal of its direction of rotation, actuates the direction-sensitive mechanism, so that after a predetermined minimum angle of rotation, a switch is actuated by the mechanism to cut off the electric power from the motor, which then coasts to a stop. The reversal of rotation of the driving means simultaneously actuates the depressed parking mechanism within the minimum angle of rotation, so that, when the power circuit is opened, the windshield wiper blades are in parked position substantially against the lower edge of the windshield outside of the normal field of vision of the operator of the vehicle.

The electric motor 20 is provided with an end head 22 integral with a gear case 24 in which is positioned worm gear 26 adapted to be driven by a worm (not shown) formed on the armature shaft of the motor. The worm gear 26 is affixed to a shaft 28, journalled in a boss 30 of the case 24, to extend to its exterior where a crank arm 32 is attached thereto in a driving relation to operate extraneous devices (not shown) such as windshield wiper devices. This portion of the mechanism is conventional in design and may vary widely in its details depending upon the use to which the device is to be put.

Figure 5:
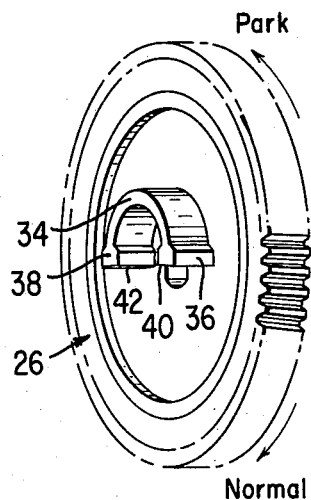
Fig. 5 is an isometric view of the gear wheel mounted in the casing.
Figure 10:
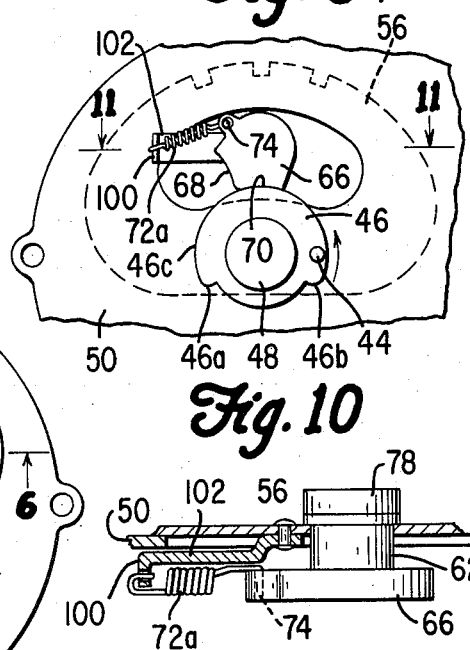
Fig. 10 is an elevation of a modification of the spring arrangement of the device.

The worm gear 26 is provided on its left or forward face (Figs. 1 and 5) with an arcuate concentric lug 34 integral with the body of the gear, which terminates in a pair of abutments 36 and 38 having faces 40 and 42 approximately 180° apart, which, during the rotation of the gear, contact a pin 44, positioned a fixed distance from the center of rotation in a notched disc 46 rotatably journalled on a stud 48 concentrically positioned (Fig. 3) with reference to the shaft 28 in a closure plate 50, affixed to the casing 24 by suitable means such as screws 52. When the gear 26 is rotated by the motor 20, the faces 40 and 42 contact the pin 44 depending on the direction of rotation of the gear 26 to form a driving relation between the gear and the notched disc 46, held in position in concentric relation by the plate 50, Above the position of the stud 48 (Fig. 3) the plate 50 is provided with an aperture 54 which falls within the locus of the perimeter of the notched disc 46 as is best seen in Figs. 1, 3, and 10. An adjustable plate 56 is provided pivoted on the outside of the plate 50 on the stud 48 to cover the aperture 54, notches 58 being provided to give purchase to a tool for manual adjustment about the stud. Approximately at a central location on the adjustable plate 56, an aperture 60 is provided in which is positioned journal collar 62 brazed in place to provide a bearing for the pintle 64 of a cam member 66, which has a pair of arcuate cam surfaces 68 and 70 which are adapted to slide over the perimeter of the notched disc 46 as it is rotated in a selected direction by the gear 26, selective contact between the parts being provided by a centering spring 72 having one end positioned in aperture 74 on the cam member 66, while the other end 76 is anchored in any convenient manner in the plate 56. The end 64a of pintle 64 is provided with a non-circular portion on which is fitted, by fusion or the like, an arm 78, so that when the cam member changes its rotative position, the arm 78 will assume a like position, for the purpose of actuating a switch as will be described hereinafter.

The adjustable plate 56 is provided on its outer side with an enclosed switch 80, which comprises an insulating base member 82 and a cover plate 84, which are attached to the plate 56 by rivets 86, spun over in bosses 88 formed in the plate. The cover plate 84 is provided with spaced contact elements 90 and 92 riveted thereto in a well known manner, being insulated from each other by the insulating qualities of the cover plate material. In the hollow between the base member and the cover plate, a sliding switch member 94 is provided which has riveted thereto a U-shaped conducting member 95 of spring material which closes the circuit between the contact elements 90 and 92, as is best seen in phantom in Fig. 9. The open circuit position of the switch member 94 is seen in Fig. 6. The base member 82 is provided with an opening in its floor, through which project a pair of abutments 96 and 98 to cooperate with the arm 78 on the cam member 66 which fits between the abutments and is adapted to move the sliding switch member 94 back and forth from open to closed position and vice versa as the cam member is being actuated. The base member 82 is provided with a hollow hood member 82a which contacts at its bottom edge the forward face of the plate 56 to protect the arm 78 from dirt and the like.

A cycle of operation of the device will now be described. With the reversible motor 20 rotating in its normal direction so that the worm gear 26 rotates in a clockwise direction looking at the gear from the left in Figs. 1 and 5, a contactual relation between the surface 40 and the pin 44 will be established which also drives the notched cam disc 46 in the same direction, inasmuch as both elements are rotatable about a common center, as already described. Looking at the notched disc from the opposite side, as viewed in Fig. 3, the disc will rotate counterclockwise, as indicated in the drawing by the arrow. This rotation of the disc 46 under normal operation will bring the shoulder 46a into contactual relation with the arcuate cam face or surface 70 on the cam member 66 and moves the member in a clockwise direction (Fig. 3) against the bias of the spring 72, so that the cam surface 70 will contact the peripheral surface 46c of the disc 46, as shown in Fig. 10. This will move the switch element 94 to the right (Fig. 6) by the interaction of the arm 78 and the abutment 98 on the switch element 94 and place the U-shaped element 95 in a position where the electric circuit between contact elements 90 and 92 is closed, which will maintain the power circuit to the motor 20 closed during normal operation thereof. This condition will not change, even though the cam element 66 moves again to vertical position under the action of the spring bias, when the notched portion thereof between the shoulders 46a and 46b again moves into the locus of the cam member 66. There is provided sufficient lost motion in the elements of the mechanism to allow this movement of the cam member 66. This condition of the mechanism remains the same until the operator changes the position of the reversing switch to parked position, as shown in Fig. 9.

When the motor power connections are reversed, and the motor reverses its direction of rotation, the rotation of the worm gear 26 also reverses its rotation, which breaks the driving relation between the surface 40 and the pin 44, and after approximately 180° of reverse rotation (counterclockwise Fig. 5) of the gear, the surface 42 contacts the opposite side of the pin 44, to establish a new driving relation between the gear 26 and the disc 46, which is clockwise, as shown in Fig. 3. This lost motion of about 180° is necessary in some arrangements of windshield wiper linkages to give the elements controlling the depressed parking ample movement to change the relations in the mechanism to bring about the necessary parking of the wiper blades to the desired depressed condition. The lost motion may be dispensed with by a direct connection between the gear and disc, or it may be increased to approximately 360° if desired by changing the relation of the faces 40 and 42.

With the clockwise rotation (Fig. 3) of the notched disc, the cam face 68 on the cam member 66 is contacted by the shoulder 46b which rotates the cam member 66 in a counterclockwise direction which also rotates the arm 78 to make contact with the abutment 96 on the switch slide portion 94 to move it to the left to the open circuit position shown in Fig. 6. This opens the power circuit to the motor 20, which then coasts to a stop. In the meantime, the wiper blades are moved to the parked position which is coordinated with the actuating elements of the switch device. The parts of the mechanism remain in this position until a new cycle of operation is initiated by the operator by again starting the motor in its normal direction of rotation as described before.

Figure 11:
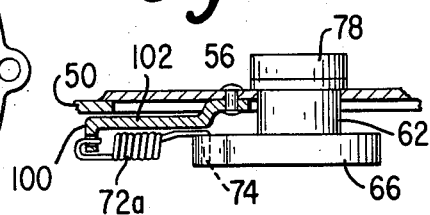
Fig. 11 is a sectional plan view of the modification taken along the line 11—11 of Fig. 10.

In the modification disclosed in Figs. 10 and 11, a helical spring 72a is substituted for the spring 72 described before. One end of the helical spring is bent at right angles and fitted into the aperture 74 in the cam member 66, while the other end is anchored in an ear 100 of a bracket 102 which is riveted to the plate 56, as seen in Fig. 11. The spring 72a biased the cam member 66 to neutral position where its lower portion extends into the notch of the disc 46 between the shoulders 46a and 46b, as seen in Fig. 3. Otherwise the construction and operation of the device is the same.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a direction-sensitive device, a rotatable member adapted for rotation in either direction, a pair of shoulders formed by an indentation in the perimeter of the rotatable member, a pawl member having a projection formed by two arcuate surfaces adapted to cooperate with the shoulders on the rotatable member to position the pawl member in different angular positions in the same plane depending on the direction of rotation of the rotatable member, and resilient means to bias the pawl member to an intermediate angular position.

2. In a direction-sensitive device, a rotatable disc adapted for rotation in either direction, an indentation in the periphery of the disc to provide a pair of shoulders facing each other, a pawl member having an axis of rotation a fixed distance from the axis of rotation of the rotatable disc and parallel thereto, said pawl member having a projection bounded by two arcuate surfaces capable of extending into said indentation of the rotatable disc to cooperate with the shoulders in the plane of rotation of the disc, and resilient means to bias the projection on the pawl member into the indentation to cooperate with either of the shoulders to rotate the pawl member to either one of two extreme positions depending upon the direction of rotation of the disc, said positions of the pawl being maintained by contact between an arcuate surface on the pawl and the perimeter of the disc.

3. A direction-sensitive device, a control member capable of being rotated about an axis in either direction, a controlled member cooperating with the control member in its plane of rotation including at least three interengaging portions adapted to be moved to two extreme positions about an axis thereby depending upon the direction of rotation of the control member, and resilient means to urge the controlled member to a medial position between the two extreme positions, said medial position approximating a line between the axes of the two members.

4. In a direction-sensitive device, a rotatable member adapted for rotation on an axis in either direction, a pair of shoulders on the rotatable member facing each other and positioned an equal distance from the axis of rotation, a pawl member rotatable about a pivot a fixed distance from the axis of rotation of said rotatable member having a projection adapted to cooperate with the shoulders on the rotatable member in its plane of rotation to rotate the pawl member to at least two different angular positions depending on the direction of rotation of the rotatable member, and resilient means to bias the pawl member to an intermediate angular position approximating a line between the axes of rotation of the members.

5. In a direction-sensitive device, a rotatable disc adapted for rotation on an axis in either direction, at least one indentation in the periphery of the disc to provide shoulders facing each other, a pawl member having a center of rotation a fixed distance from the axis of rotation of the rotatable disc and parallel thereto, said pawl member having at least one projection capable of extending into said indentations of the rotatable disc to cooperate with the shoulders in the plane of rotation of the disc, and resilient means to urge the projections on the pawl member into the indentations to cooperate with either of the facing shoulders to rotate the pawl member to varying angular positions depending upon the direction of rotation of the disc.

References Cited in the file of this patent

UNITED STATES PATENTS

| | | |
|---|---|---|
| 1,924,351 | Doddridge | Aug. 29, 1933 |
| 2,491,697 | Vischulis | Dec. 20, 1949 |
| 2,513,247 | Morton | June 27, 1950 |

FOREIGN PATENTS

| | | |
|---|---|---|
| 892,859 | Germany | Oct. 12, 1953 |